March 23, 1965  A. R. HOLLISTER ETAL  3,174,328
NONCONTACTING FLUID GAGE
Filed Jan. 2, 1962  2 Sheets-Sheet 1

INVENTORS
Allen R. Hollister
William J. Blaiklock
BY Spencer, Rockwell & Bartholow
ATTORNEYS INVENTORS
Allen R. Hollister
William J. Blaiklock
BY Spencer, Rockwell & Bartholow
ATTORNEYS

United States Patent Office 3,174,328
Patented Mar. 23, 1965

3,174,328
NONCONTACTING FLUID GAGE
Allen R. Hollister, East Hartford, and William J. Blaiklock, Collinsville, Conn., assignors to Pratt & Whitney Inc., a corporation of Delaware
Filed Jan. 2, 1962, Ser. No. 163,720
8 Claims. (Cl. 73—37.7)

This invention relates generally to a noncontacting fluid gage for measuring or gaging a part or object. More particularly, the invention relates to a noncontacting fluid gage which positions itself with respect to the parts to be measured without physically contacting the part. More specifically, the invention relates to a fluid gage such as an air gage mounted in conjunction with a machine such as a centerless grinder, for continual measuring or gaging of the parts delivered from the machine without physically contacting the parts.

Fluid gages used in conjunction with machines delivering a constant flow of parts permit every part to be gaged or checked for proper size within tolerance. The gage may be used to signal an operator or to adjust and control the machine through a suitable circuit. However, in order to assure proper positioning of the gage with respect to the part being checked, it has been necessary to have the part physically contact a positioning stop on the gage. This has been objectionable since it may cause a slow-down in parts being delivered which, in the case of the centerless grinder, may result in the parts being ground with a taper.

Accordingly, it is an object of this invention to provide a gage which will position itself with respect to the parts being gaged without requiring physical contact of the part with the gage.

Another object of this invention is to provide a gage for gaging all parts passing the gage without effecting a slow-down in the rate of parts delivery.

A further object of the invention is to provide a gage which will align itself with the part being measured regardless of the position of the part and without contacting the part.

A still further object of the invention is to provide a gage which will measure parts being delivered from a machine and which may be used to control the machining operation to maintain the parts within the allowable size tolerance.

Still other objects and advantages of the invention will in part be obvious and will in part be apparent from the specification.

Generally speaking, in accordance with this invention, a fluid gage such as an air gage is provided with opposed gaging nozzles to gage the size of a workpiece therebetween. The gage is mounted adjacent the delivery station of a machine to gage all parts being delivered therefrom. The gage is flexibly mounted with respect to the machine so that its position may move horizontally and vertically in a plane perpendicular to the axis of parts delivery. Means are provided to cause the gage to be drawn toward each part in gaging relationship without physically contacting it, so that accurate gaging may be assured.

The invention accordingly comprises the features of construction, combination of elements, and arrangement of parts which will be exemplified in the construction hereinafter set forth, and the scope of the invention will be indicated in the claims.

For fuller understanding of the invention, reference is had to the following description taken in connection with the accompanying drawings, in which.

Figure 1:
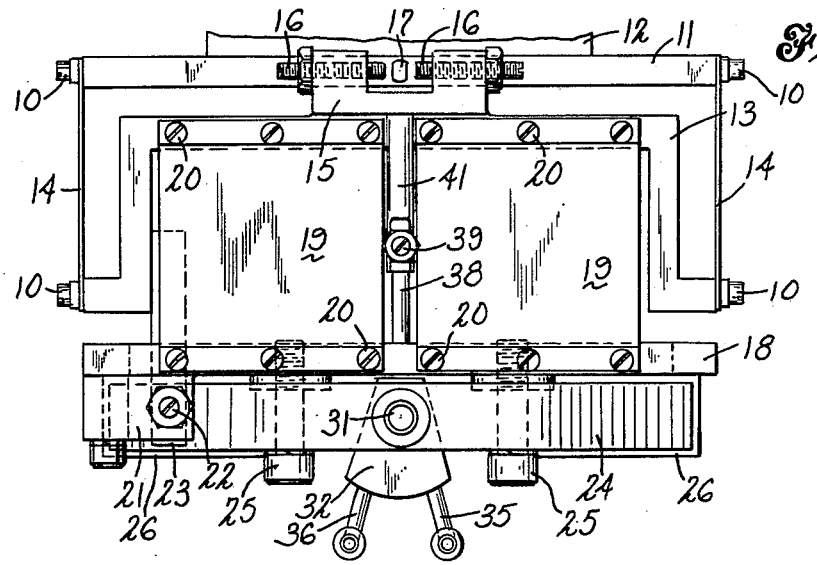
FIG. 1 is a top plan view of a gage according to the invention.

Referring now to FIG. 1, a stationary frame 11 is mounted on a support 12 which forms part of a machine (not shown) delivering parts to be gaged. Such a machine may be a centerless grinder, for example, or any other machine which delivers a continuous flow of parts. An inner frame 13 is connected to stationary frame 11 through four vertical reeds 14, suitably attached by means of screws 10 to the frames 11 and 13, thereby permitting horizontal side-to-side movement of the inner frame with respect to the stationary frame. A stop support 15 is mounted on inner frame 13 and is provided with a pair of adjustable stops 16 adapted to engage a stop pin 17 projecting from stationary frame 11. The horizontal side-to-side movement of inner frame 13 with respect to stationary frame 11 by deflection of vertical reeds 14 may be limited by engagement of adjustable stops 16 with stop pin 17.

Figure 2:
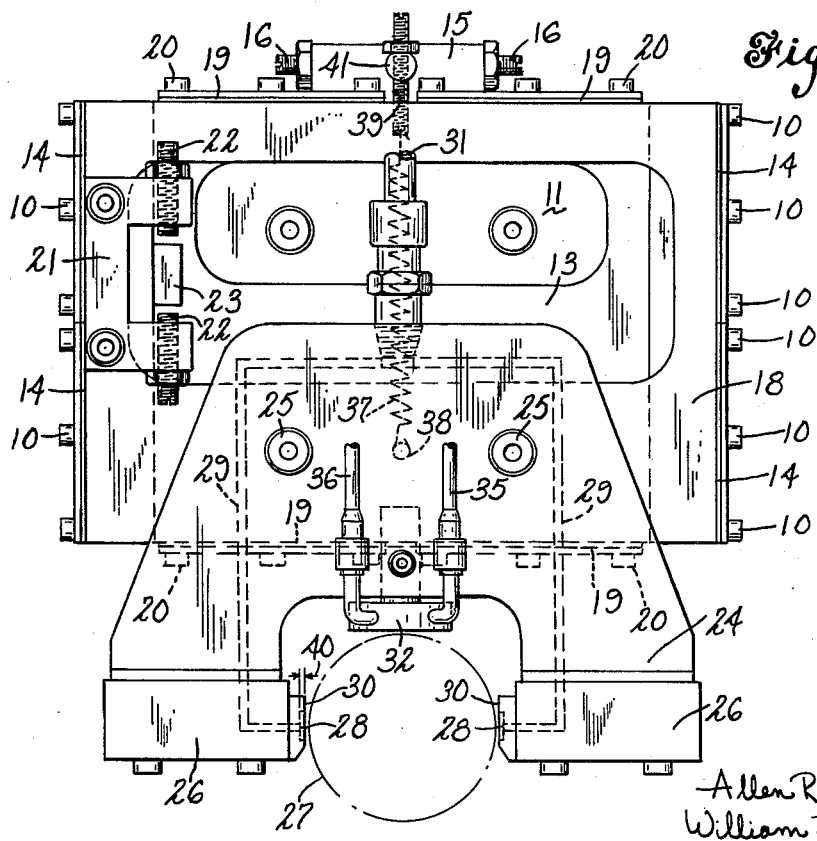
FIG. 2 is a front elevational view of the gage of FIG. 1.
Figure 3:
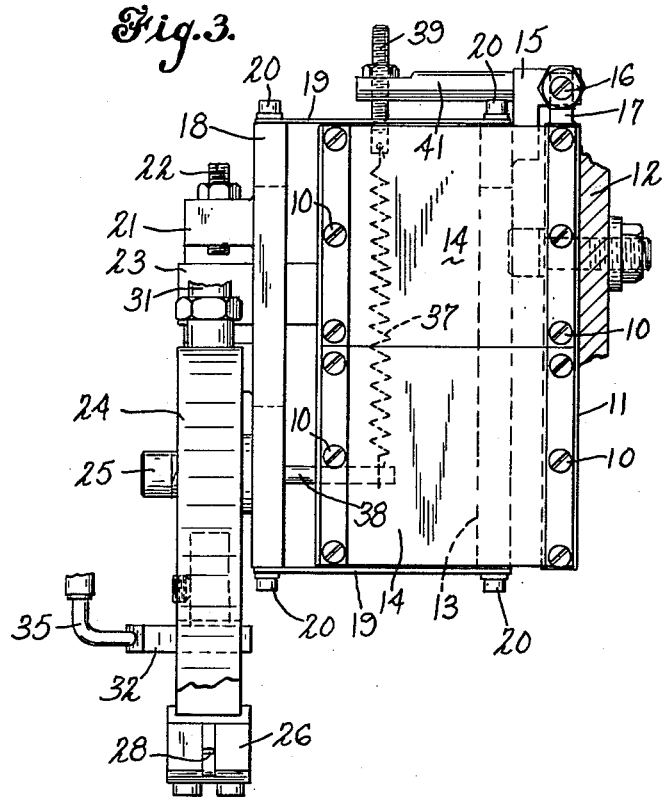
FIG. 3 is a side elevational view of the gage shown in FIGS. 1 and 2, with portions broken away for the sake of clarity.

Referring now to FIG. 3, an outer frame 18 is connected to inner frame 13 through four horizontal reeds 19, attached to the frames by means of screws 20. The reeds permit a vertical movement of outer frame 18 with respect to the inner frame. Outer frame 18 is also provided with a stop support 21 which carries a pair of adjustable stops 22 (FIG. 2). Stop bar 23 extends from inner frame 13 and is disposed between adjustable stops 22 so that the limit of up and down vertical movement of outer frame 18 with respect to inner frame 13 may be controlled by engagement of adjustable stops 22 with stop bar 23.

Referring particularly to FIGS. 2 and 3, a substantially U-shaped gage yoke 24 is suitably mounted, as by means of screws 25, on outer frame 18. To each of the two outer ends of the legs of the yoke is attached a measuring jaw 26, the two jaws being positioned to have a workpiece 27 pass therebetween. Each of measuring jaws 26 carries a measuring nozzle 28 adapted to be positioned adjacent the surface of the workpiece. In the usual gage yoke, the end of the nozzle is spaced below the measuring jaw surface 30 adjacent the workpiece being measured. This spacing is necessary to prevent a substantial increase in pressure at one of the nozzles when the workpiece closely approaches the associated measuring jaw surface. The excessive increase in pressure at that nozzle usually cannot be compensated by a corresponding decrease in pressure at the other nozzle and, therefore, results in incorrect gage reading. However, the reed mounting of the yoke permits the gage to centralize itself with respect to the workpiece, thereby permitting the nozzle spacing or standoff 40 to be greatly reduced. The reduced standoff increases the range or tolerance of workpiece sizes which may be successfully measured by the gage. The two measuring nozzles are joined by means of a passage 29 which is connected to a supply port 31 through which will be fed a fluid such as air.

A shoe 32 is attached to the yoke between the legs thereof. The shoe is vertically displaced from the diametrically opposed measuring nozzles to permit the major diameter or plane of the workpiece to be measured, to pass between the measuring nozzles without having any portion of the workpiece contact the shoe.

Figure 4:
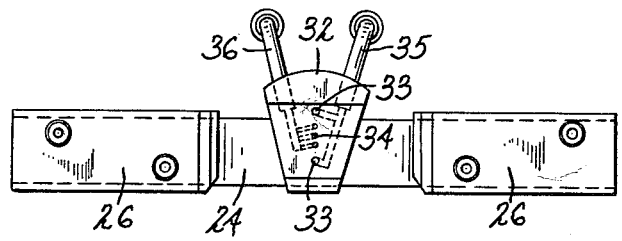
FIG. 4 is a bottom plan view of the gage showing the nozzle-carrying elements only.

Referring to FIG. 4, the shoe 32 is provided with a pair of outer positioning jets 33 displaced from one another along the axis of workpiece feed and a plurality of sensing nozzles 34 located on the same axis and between the positioning jets. A first supply line 35 connects the positioning jets to a fluid supply and a second supply line 36 connects the sensing nozzles to a separate fluid supply.

The gage may be disposed in any plane. As an example, the drawings show it disposed vertically for vertical movement of the shoe. In this position, it is necessary to balance the weight of the outer frame carrying the yoke. Otherwise, the weight of the yoke would cause deflection of the horizontal reeds with respect to the inner frame. The balancing may be done by a spring 37 connected between a rod 38 attached to the outer frame and an adjusting screw 39 threaded into a bar 41 attached to the inner frame. The adjustment of the spring tension to effect proper balance is controlled by the adjusting screw.

The operation of the gage may be most easily described with reference to FIG. 2. Workpieces 27 are delivered from a machine such as a centerless grinder (not shown) along a track (not shown) which supports the workpieces. As a workpiece passes beeween the measuring jaws 26, the gage is held out of contact with the workpiece by means of spring 37. A fluid such as air is forced under pressure through supply port 31 and escapes through measuring nozzles 28. At the same time, fluid under pressure is forced through positioning jets 33 and flows over the workpiece. By means of a principle sometimes known as the Bernoulli principle, a pressure drop between the workpiece and shoe 32 is created by the flow, thereby causing the shoe to be sucked down toward the workpiece. The vertical movement of the gage is effected by deflection of horizontal reeds 19. The pressure drop will cause the shoe to closely approach the surface of the workpiece but contact will be prevented by the layer of escaping fluid. As a yoke descends on the workpiece, fluid continually escapes through measuring nozzles 28 and any unevenness in pressure on the two sides will cause deflection of the yoke through vertical reeds 14. The yoke therefore aligns itself both horizontally and vertically with respect to the workpiece without contacting the workpiece at any time.

Vertical and horizontal movement of the gage when mounted to a centerless grinder is particularly necessary. It is well known that five adjustments in workpiece size generated by the grinder are effected by adjustment of the track which feeds the workpieces and delivers them from the grinder. It is therefore necessary that the gage be capable of following the track movement.

Changes in size of the workpiece may be measured by a pressure or flow gage operated by the back pressure or flow through supply port 31 in any well known manner. When changes in size of the workpiece are registered, the changes may be brought to the attention of the machine operator by means of a dial gage, signal light or other recording or signalling device or may be automatically fed to the control circuit of the machine by means of hydraulically operated devices to automatically adjust the machine as required.

Since the gage is held down adjacent the workpiece only when a workpiece is present, the end of a workpiece or grooves or slots in the workpiece passing under the positioning jet will break the vacuum and the gage will rise to the equilibrium position under the tension of spring 37. In order to eliminate the constant up-and-down movement of the yoke when a plurality of parts is consecutively delivered to the gage or when the parts have grooves or slots which affect the positioning vacuum, to axial positioning jets are provided to cause the gage to hover in the down position. As long as the groove in the part or the distance between parts is no greater than the distance between positioning jets, one or the other of the jets will be positioned over a workpiece surface to provide the necessary vacuum.

When these aforementioned grooves or the spaces between parts pass the measuring nozzles, a substantial increase in flow and drop in pressure will be registered through supply port 31. Such substantial pressure drops would normally effect a shut-off in the machine until the cause for the pressure drop could be maintained. In order to prevent cut-off of the machine or improper measuring when a groove or the space between parts is passing the measuring nozzles, the shoe is also provided with a plurality of sensing nozzles 34, which sense the presence of a part. Through a control circuit (not shown), when the presence of a part is sensed by the sensing nozzles, the circuitry controlled by the measuring nozzles will be fully operative. However, when the sensing nozzles sense the absence of a part to be measured, the circuit controlled by the measuring nozzles will be rendered inoperative until the sensing nozzles again sense the presence of a part.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A device for gaging the size of a workpiece comprising a gage support, a gaging member, means for flexibly mounting said gaging member on said gage support to permit deflection of said gaging member in a first plane with respect to said gage support, means for flexibly mounting said gaging member on said gage support to permit deflection of said gaging member in a second plane perpendicular to said first plane with respect to said gage support, fluid-operated gaging nozzles mounted on said gaging member in substantially opposed relationship for positioning said gaging member in said first plane with respect to the workpiece and for gaging the size of the workpiece, and fluid-operated locating means mounted on said gaging member for positioning said gaging nozzles in said second plane in gaging relationship with respect to the workpiece, whereby the flow of fluid under pressure from said locating means over the workpiece causes said gaging member to be drawn vertically downward toward the workpiece in adjacent, noncontacting relationship.

2. In a fluid gage, the combination comprising a stationary frame, an inner frame, vertical means for flexibly mounting said inner frame on said stationary frame to permit horizontal deflection of said inner frame with respect to said stationary frame, a gaging member, horizontal means for flexibly mounting said gaging member on said inner frame to permit vertical deflection of said gaging member with respect to said inner frame, at least two fluid-operated gaging nozzles mounted on said gaging member in substantially opposed relationship, and fluid-operated locating means mounted on said gaging member for positioning said gaging nozzles in gaging relationship with respect to the workpiece.

3. The structure defined in claim 2 wherein said first-named flexible mounting means comprise a plurality of vertically positioned reeds.

4. The structure defined in claim 2 wherein said second-named flexible mounting means comprise a plurality of horizonally positioned reeds.

5. In a fluid gage, the combination comprising a stationary frame, an inner frame, a plurality of vertical reeds mounted between said stationary frame and said inner frame, a gaging member, a plurality of horizontal reeds mounted between said gaging member and said inner frame, at least two fluid-operated gaging nozzles mounted on said gaging member in substantially opposed relationship, said gaging nozzles being spaced to permit a workpiece to pass therebetween, and a fluid-operated locating nozzle mounted on said gaging member so that the flow of fluid under pressure from said locating nozzle over the workpiece causes said gaging member to be deflected with respect to said inner frame and drawn toward the workpiece in adjacent, noncontacting relationship and whereby inequality of pressure of the fluid flowing from said gaging nozzles as said gaging member is drawn toward the workpiece causes said gaging member through said inner frame to be horizontally deflected with respect to said stationary frame to provide substantially equal distance between each of said gaging nozzles and the workpiece.

6. A device for gaging the size of a workpiece comprising a gage support, a gaging member, means for flexibly mounting said gaging member on said gage support, fluid-operated gaging nozzles mounted on said gaging member in substantially opposed relationship, and at least two fluid-operated locating nozzles mounted on said gaging member for positioning said gaging nozzles in gaging relationship with respect to the workpiece and displaced from one another along a line parallel to the direction of entry of the workpiece to the gaging position, whereby the flow of fluid under pressure from said locating nozzles over the workpiece causes said gaging member to be drawn toward the workpiece in adjacent, noncontacting relationship and whereby the flow of fluid from any one of said locating nozzles over the workpiece will maintain said gaging nozzles in gaging relationship with respect to the workpiece.

7. A device for gaging the size of a workpiece comprising a gage support, a gaging member, means for flexibly mounting said gaging member on said gage support to permit deflection of said gaging member with respect to said gage support, fluid-operating gaging nozzles mounted on said gaging member in substantially opposed relationship, fluid-operated locating means mounted on said gaging member for positioning said gaging nozzles in gaging relationship with respect to the workpiece, and fluid-operated sensing means mounted on said gaging member for sensing the presence of the workpiece, whereby the flow of fluid under pressure from said locating means over the workpiece causes said gaging member to be drawn toward the workpiece in adjacent, non-contacting relationship and whereby said fluid-operated gaging nozzles are controlled by said sensing means to effect the gaging operation only when said sensing means sense the presence of the workpiece, said fluid-operated locating means comprising at least two locating nozzles displaced one from another along a line parallel to the direction of entry of the workpiece to the gaging position so that the flow of fluid under pressure from any one of the locating nozzles over the workpiece will maintain said gaging nozzles in gaging relationship with respect to the workpiece.

8. The structure defined in claim 7 wherein said sensing means comprises at least one fluid-operated sensing nozzle mounted on said gaging member adjacent said locating nozzles.

References Cited in the file of this patent
UNITED STATES PATENTS

| | | |
|---|---|---|
| 1,946,924 | Allen et al. | Feb. 13, 1934 |
| 2,190,306 | Balsiger | Feb. 13, 1940 |
| 2,276,036 | Hanna et al. | Mar. 10, 1942 |
| 2,845,791 | Loxham et al. | Aug. 5, 1958 |